US00RE37376B1

(19) United States
(12) Reissued Patent
Gelbart

(10) Patent Number: US RE37,376 E
(45) Date of Reissued Patent: Sep. 18, 2001

(54) METHOD FOR RAPID IMAGING OF THERMOGRAPHIC MATERIALS BY EXTENDING EXPOSURE TIME IN A SINGLE BEAM LASER SCANNER

(75) Inventor: Daniel Gelbart, Burnaby (CA)

(73) Assignee: Creo Products Inc., Burnaby (CA)

(21) Appl. No.: 09/618,750

(22) Filed: Jul. 14, 2000

Related U.S. Patent Documents

Reissue of:
(64) Patent No.: 6,072,518
Issued: Jun. 6, 2000
Appl. No.: 08/861,065
Filed: May 21, 1997

U.S. Applications:
(63) Continuation-in-part of application No. 08/699,025, filed on Aug. 16, 1996, now abandoned.

(51) Int. Cl.[7] ..... B41J 2/47
(52) U.S. Cl. ..... 347/239; 347/255
(58) Field of Search ..... 347/233, 234, 347/237, 239, 247, 253, 255

(56) References Cited

U.S. PATENT DOCUMENTS 3,750,189 * 7/1973 Fleischer ..... 347/137
4,206,482 * 6/1980 De Lavalette et al. ..... 358/491
4,348,593 * 9/1982 Seachman ..... 250/578
4,357,627 * 11/1982 Johnson ..... 347/135
4,595,957 * 6/1986 Holthusen ..... 358/480
4,639,073 * 1/1987 Yip et al. ..... 359/315
5,049,901 * 9/1991 Gelbart ..... 347/239
5,132,723 * 7/1992 Gelbart ..... 355/40
6,025,864 * 2/2000 Nashimoto ..... 347/243

* cited by examiner

*Primary Examiner*—N. Le
*Assistant Examiner*—Anh T. N. Vo
(74) *Attorney, Agent, or Firm*—Oyen Wiggs Green & Mutala

(57) ABSTRACT

The exposure time of high data rate single spot laser scanner can be extended by the use of Time Domain Integration (TDI) mode imaging to expose thermographic materials. Many thermographic materials, such as thermal printing plates, can not be properly exposed in single spot scanners such as internal drum scanners, due to the shortness of the exposure time of a single spot, but can be exposed by the extended exposure time of TDI scanning. The Scophony effect can also be used as a method of TDI.

16 Claims, 5 Drawing Sheets

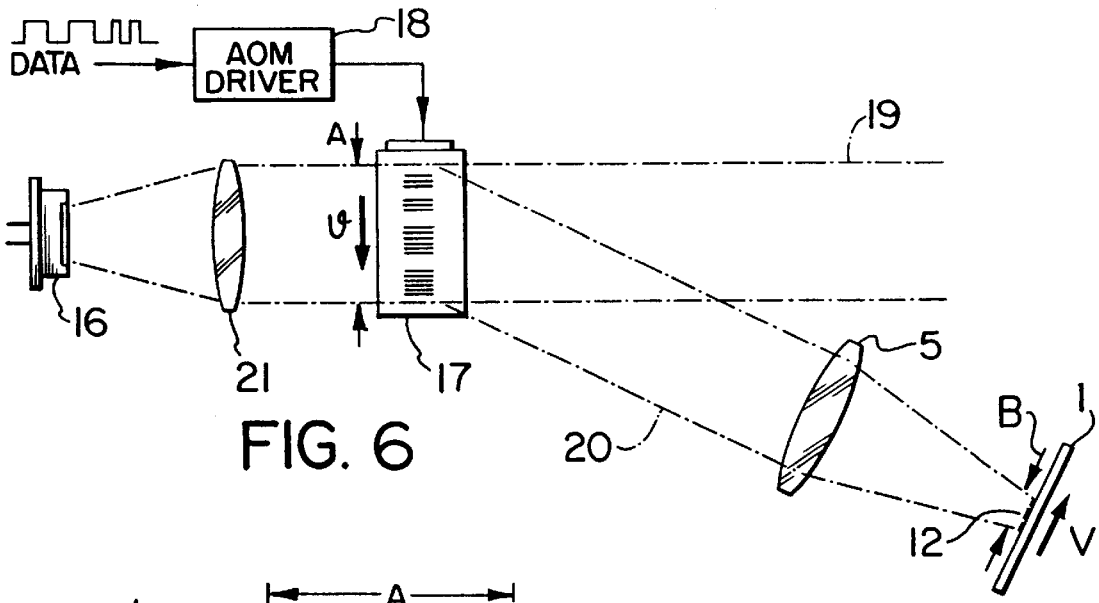
FIG. 6
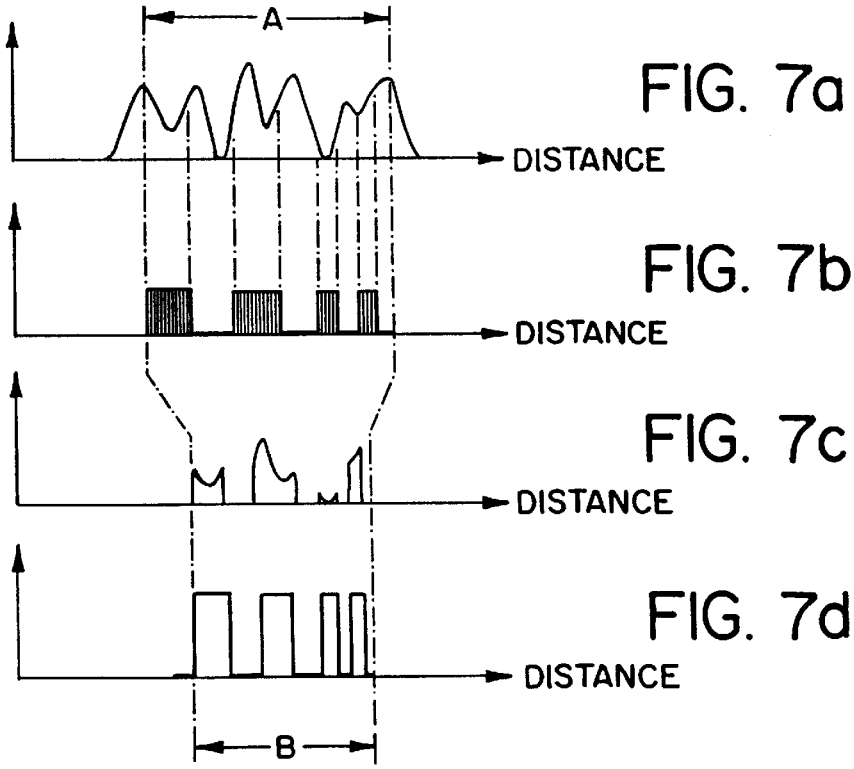
FIG. 7a
FIG. 7b
FIG. 7c
FIG. 7d

METHOD FOR RAPID IMAGING OF THERMOGRAPHIC MATERIALS BY EXTENDING EXPOSURE TIME IN A SINGLE BEAM LASER SCANNER

Matter enclosed in heavy brackets [ ] appears in the original patent but forms no part of this reissue specification; matter printed in italics indicates the additions made by reissue.

*CROSS REFERENCE TO RELATED APPLICATION*

*This application is a continuation-in-part of application Ser. No. 08/699,025 filed Aug. 16, 1996, abandoned.*

FIELD OF THE INVENTION

The invention relates to laser scanning and in particular, to scanning of thermal materials, also known as thermographic materials, with high power lasers.

BACKGROUND OF THE INVENTION

With the increased speed of laser scanning systems the exposure time of a single pixel is exceedingly short. This time is sometimes too short for the desired chemical reaction to take place in the material being exposed. Increasing the power does not solve the problem, as it causes the top layer of the material to become too hot and ablate or decompose, while the material below the surface remains cold.

For example, in a modern laser scanner of the internal drum type used to expose thermal printing plates, dwell times as short as 10 nS are used. This exposure time is much shorter than the thermal time constant of the plate active polymer layer, being about 1 $\mu$S for a typical plate. As the exposure time is about 100 times shorter than the thermal time constant, the surface of the polymer has to be heated up to thousands of degrees centigrade to allow the average temperature to be about a hundred degrees (after the heat distributed itself throughout the polymer layer). Such a high peak temperature causes the polymer to decompose or ablate instead of undergoing the desired transformation.

The common solution is to use a multibeam system, as the exposure time of each spot goes up in proportion to the number of beams for a given data rate. Multibeam systems increase the cost of a laser scanner, therefore it is desirable to increase the exposure time of a single beam system. Increasing the exposure time by simply increasing the spot size is not practical due to loss of resolution.

Another object of the invention is to achieve higher utilization of the laser. Thermal imaging systems use high power and expensive IR lasers, typically multiwatt diode-pumped YAG lasers. The present invention enables the use of lasers which are allowed to have poor beam quality in one of the spot dimensions, such as wide area laser diode emitters, which are significantly cheaper than YAG lasers. When multiple light sources are used according to the invention, no intensity matching between the sources is required. This is an advantage over systems using multiple spots in parallel, where intensity match is critical.

SUMMARY OF THE INVENTION

The invention uses a scanning beam imaging a linear array of light sources to form each spot on the material being exposed. The data is shifted serially through this linear array while the array is imaged onto the material in a mode known as Time Domain Integration (TDI). In this mode the total exposure time of each spot on the material is multiplied by the number of light sources (e.g. if the internal drum scanner used in the previous example had ten light sources, the exposure time will go from 10 nS to 100 nS while the system will stay a single beam system). In order to achieve TDI imaging, the rate of shifting the data serially through the array of light spots needs to be matched to the scanning velocity in order to achieve a stationary image of the shifting data on the material being exposed. The TDI mode of imaging is well known in imaging sensors, such as Charge Coupled Devices (CCD), where it is used to increase sensitivity by integrating the light into a longer exposure without the loss of resolution. The same light integrating property of TDI scanning is used by the present invention, in a single scan line configuration, to increase the exposure time without loss of resolution. The invention and multiple ways of using it will become apparent after considering the preferred embodiment in conjunction with the drawings.

BRIEF DESCRIPTION OF THE DRAWINGS

FIG. 6 shows schematically the invention implemented using an Acousto-Optical Modulator.

FIG. 7a to FIG. 7d shows the use of the invention with uneven laser sources to produce even exposure.

DETAILED DESCRIPTION OF THE PREFERRED EMBODIMENT

Figure 1:
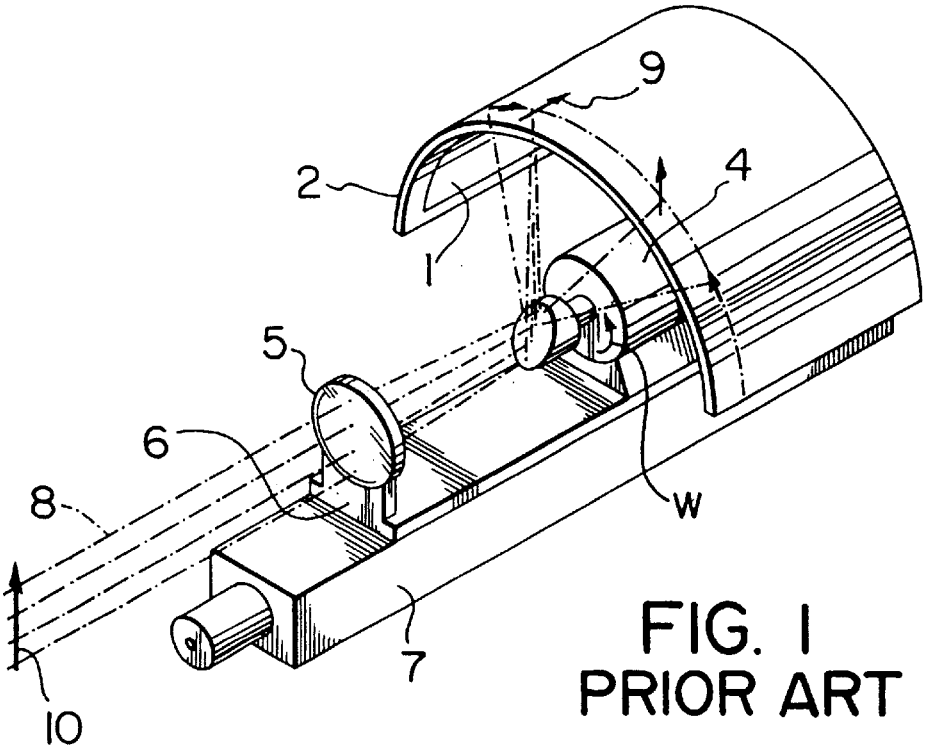
FIG. 1 PRIOR ART
FIG. 1 shows schematically a prior art laser scanner of the internal drum type.

Prior art high speed scanners are either of the internal drum type, as shown in FIG. 1, or the multichannel (also Known as multibeam or multispot) external drum type. In the internal drum type a light beam 8 is focussed onto material 1, loaded inside cylindrical surface 2, by the action of lens 5. The focussed light spot is scanned across material 1 by a scanning mirror 3 driven by motor 4. The complete scanning assembly 6 is moved along material 1 by a linear positioner 7. Note that this type of scanner causes the rotation of the optical image carried by beam 8, as shown by rotation of arrow 9 which is the image of arrow 10. For this reason beam 8 has to be a round beam, insensitive to rotation.

Figure 2:
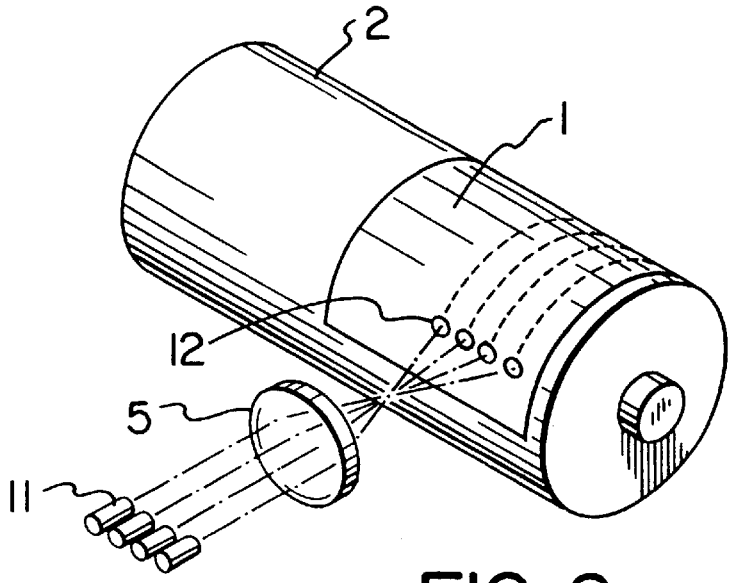
FIG. 2 PRIOR ART
FIG. 2 shows schematically a prior art laser scanner of the multibeam external drum type.

Another common type of prior art is a multispot external drum recorder shown in FIG. 2. Multiple lasers 11 are imaged by lens 5 to form multiple spots 12 on material 1, which is mounted on cylinder 2.

Figure 3:
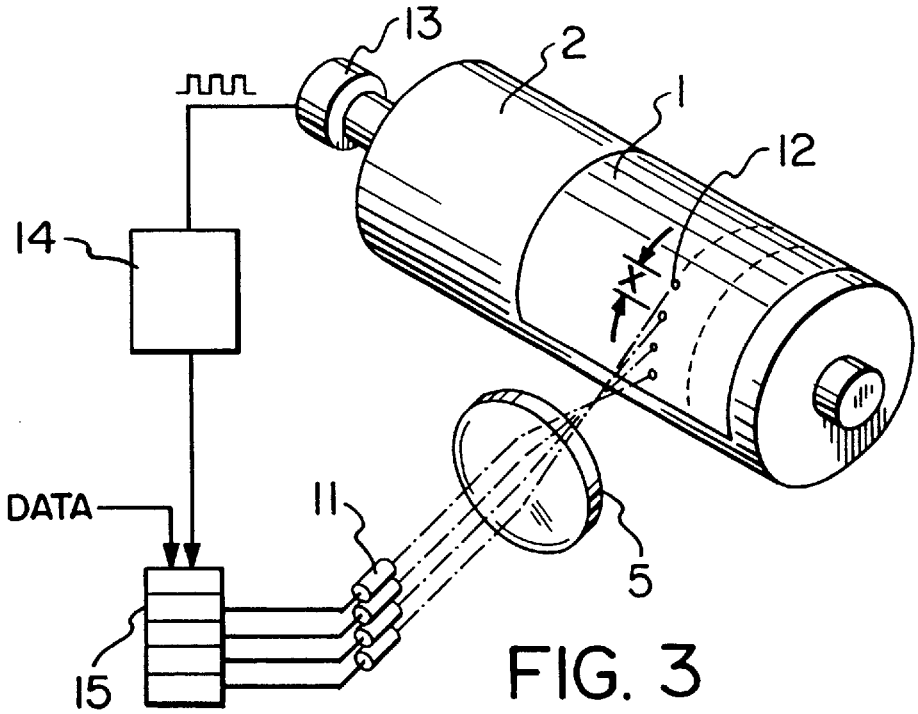
FIG. 3 shows schematically the invention implemented on an external drum scanner.

The advantage of this system over the internal drum is that a high writing speed is achieved without requiring a short exposure time for each spot. For a system with N spots, the exposure time is N times longer than in a single spot system. This is an advantage in certain types of materials, in particular thermal materials. The disadvantage lies in the need to carefully balance the intensity and shape of all the spots. FIG. 3 shows how the present invention allows one to convert the laser scanning system of FIG. 2 to have the advantages of a single spot system but retain the longer exposure times of a multispot system. The invention is more important for internal drum scanners, however it is explained first on an external drum system for conceptual simplicity.

Referring now to FIG. 3, a thermographic material 1 is mounted on drum 2. An array of laser sources 11 is imaged onto material 1 using lens 5. Spots 12 are imaged along a single line thus each one of scanning spots 12 will overlap with the previously imaged spot, forming a single line on material 1. The data to be recorded is fed to laser sources 11 via shift register 15, clocked by a clock generator 14 synchronized to the position of cylinder 2 via a shaft encoder 13. The reason for not driving shift register 15 with output of shaft encoder 13 is that the writing clock, also known as pixel clock, is normally of higher resolution than the shaft encoder output. The writing clock can be an integer or non-integer multiple of shaft encoder output. Clock generator 14 can be of the phase lock loop type, synthesizer type or any one of the many well known clock generation methods. The period of the clock is set that shift register 15 moves the data one bit in the interval the surface of media 1 travels the distance between two adjacent spots. This distance is shown as "X" in FIG. 3. Clocking the data in this fashion causes the image of a given data bit to be stationary relative to media 1 while it is being exposed, in sequence, by all laser sources 11. This mode of imaging is well known by the name Time Domain Integration (TDI) and is normally used to increase exposure. For example, U.S. Pat. Nos. 5,049,091 and 5,132,723 co-owned with this application, use TDI to increase exposure energy. In the present invention TDI is used to increase the exposure time to allow the use of certain thermal materials without increasing the energy.

Figure 4:
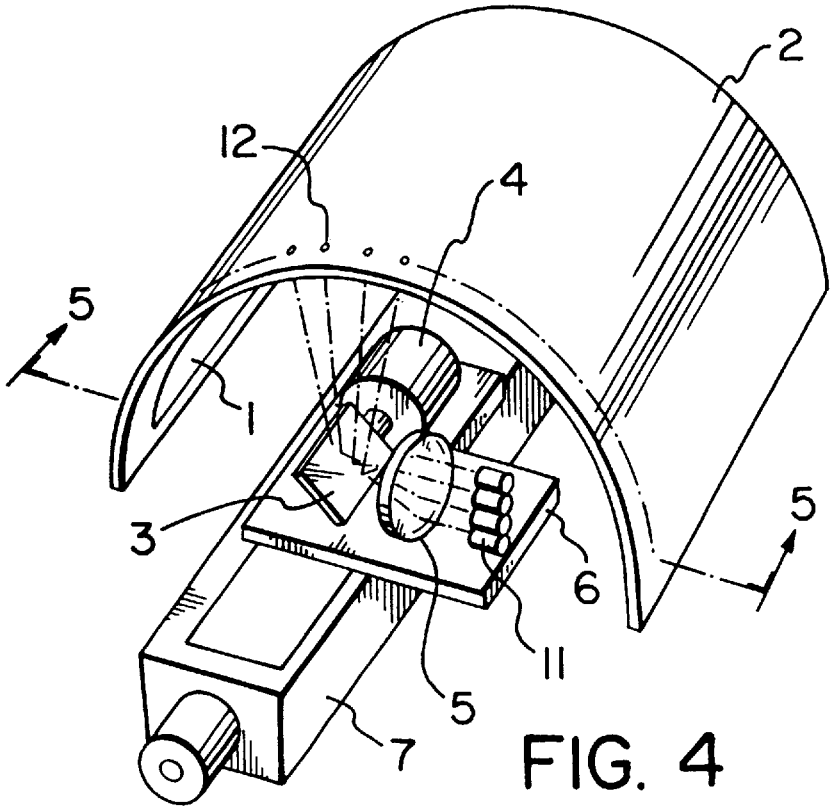
FIG. 4 shows schematically the invention implemented on an internal drum scanner.
Figure 5:
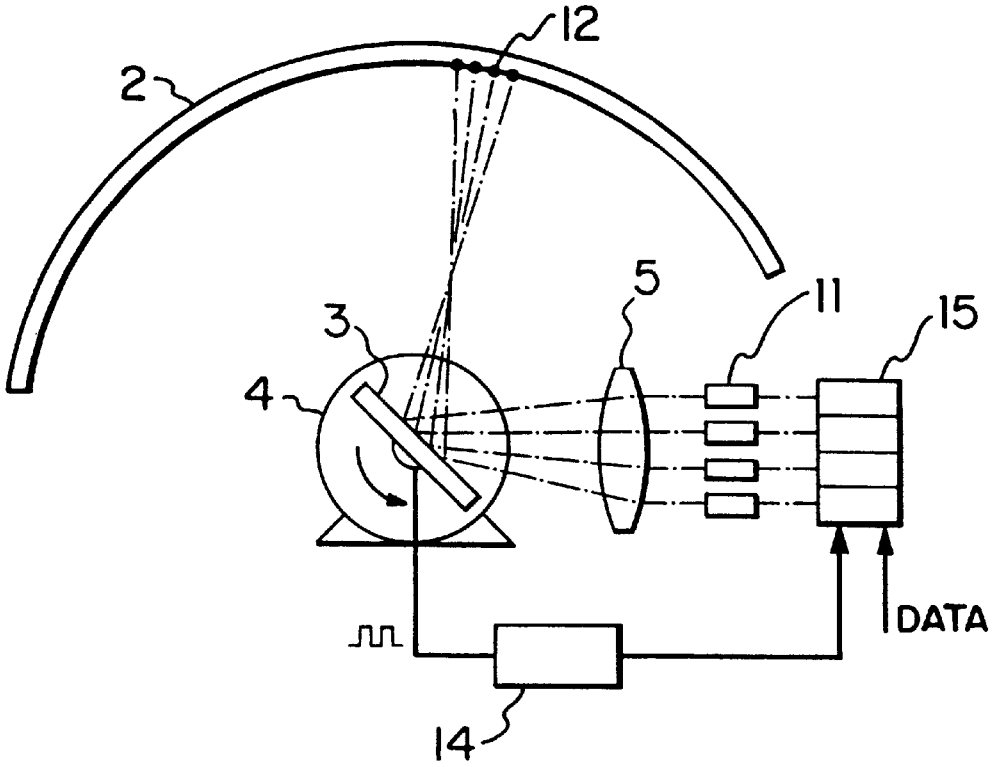
FIG. 5 shows the cross section of the internal drum scanner of FIG. 4.

The largest benefit of the invention will be found in internal drum laser scanners as shown in FIG. 4. An array of laser sources 11 is imaged as spots 12 along a single line. A mirror 3 is rotated by motor 4 to scan spots 12 across thermographic material 1. The scanning assembly 6 is moved along material 1 by a linear positioner 7. The scanning arrangement is different from what is shown in FIG. I in order to avoid the problem of image rotation explained earlier. The details of shifting the data serially through lasers 11 is identical to FIG. 3. These details are omitted from FIG. 4 for sake of clarity. More details about scanning configurations for internal drum recorders not causing rotation of image are disclosed in U.S. Pat. Nos. 4,206,482 and 4,595,957. Other de-rotation devices can be used such as the well known Dove prism or the method disclosed in U.S. Pat. No. 5,184,246. FIG. 5 shows a cross section of FIG. 4, with the data from shaft encoder (not shown) coupled to motor 4, synchronizing the shifting of the data through laser sources 11, to match the scanning velocity of spots 12. The synchronization is done via clock generator 14 and shift register 15.

It is important to understand that the present invention will work equally well with a single laser split into multiple bits as well as discrete laser sources. By the way of example, discrete light sources can be:

1. Laser diodes, in combination with beam shaping optics;
2. Fiber optics, coupled to laser diodes;
3. Light emitting diodes.

A single light source, such as a high powered laser diode or a YAG type laser can be broken up into discrete sources using the following methods:

1. Beam splitters in combination with modulators;
2. An Acousto-Optical Modulator (AOM) used as a multispot modulator;
3. Any other type of modulator capable of shifting, data in serial fashion, such as Electro-Optical Modulators (EOM).

Using Acousto-Optical Modulators and Electro-Optical Modulators in TDI mode is also related to the well known Scophony effect, in which the fact that TDI generates a stationary image on the material being exposed is used to eliminate the blur caused by the continuously moving data. In general the term TDI is used mainly with discrete motion steps and the term "Scophony Imaging" is used mainly with continuously moving data patterns, such as used in AOMs. An example of Scophony/TDI techniques can be found in U.S. Pat. Nos. 4,357,627 and 4,639,037. Both these patents use the Scophony/TDI effect in order to increase the resolution of the scanner and not in order to increase the exposure time, which is the essence of the present invention. Also, both patents do not take advantage of the possibility of using laser with non-uniform beams. The application of Scophony/TDI according to the present invention with non-uniform beams is shown in FIG. 6 and FIG. 7a to 7d. There is no fundamental difference between a laser with a non-uniform beam and an array of individual lasers with different output from each laser. In both cases the Scophony/TDI effect used by the present invention generates uniform and even spots, with long exposure times on the recorded material.

Referring now to FIG. 6, a high power laser diode source 16 is partially collimated by lens 21 and illuminates an AOM 17. The data fed into AOM 17 via AOM driver 18 travels down the AOM at a velocity which depends on the type of AOM used, typically about 4 km/sec. As AOMs are well known devices no further details on their operation is given here. The active aperture of AOM 17 is imaged onto material 1 by lens 5. Either the zero order beam 19 or the diffracted beam 20 can be used (obviously the data needs to be inverted if the zero order beam 17 is used). The traveling acoustic wave inside AOM 17 is a replica of the serial data pattern and diffraction only occurs where the travelling wave, caused by the RF drive, is present. If the size of the travelling bit pattern is A and the size of the image of this pattern is B (see FIG. 6 for definitions of A, B, $v$ and V), and the corresponding velocities of the acoustic wave and the scanning speed are $v$ and V, the image of a bit will be stationary relative to material 1 when $A/B=v/V$. This is the well known Scophony condition. At this point the exposure time of each bit will be $A/v$. For a typical AOM, "A" can be easily made 10 mm, $v \sim 4$ mm/$\mu$S, giving exposure time of 2.5 $\mu$S, which is sufficient for most thermal materials.

FIG. 7-a to FIG. 7d shows how the present invention can be utilized to achieve uniform pixel to pixel exposure from non-uniform laser sources. FIG. 7a represents the radiation profile of laser diode 16 of FIG. 6. As is the case with many wide emitter laser diodes, the profile is non-uniform with multiple "dark spots". FIG. 7b is the acoustic wave travelling through the AOM of a given point in time. The exposure profile of the diffracted beam (20 in FIG. 6) of a given point in time is the product of FIG. 7a and FIG. 7b, shown in FIG. 7c. The profile is non-uniform, showing the same "dark spots" as the laser diode. Due to the Scophony mode of scanning, each pixel on the material will be scanned by the complete profile of the laser diode captured by the active aperture "A" of the AOM, thus the total exposure of each bit will be the same, as shown in FIG. 7d. FIG. 7d is the final exposure of the data pattern, after all pixels completed their scan. A highly uniform exposure is possible from a highly uneven source without the waste of laser power or special effort to balance the exposure. This feature of the present invention allows the utilization of lower cost lasers. It is obvious that the same method can be used not only with AOMs, but for any modulator or array of lasers.

Figure 8:
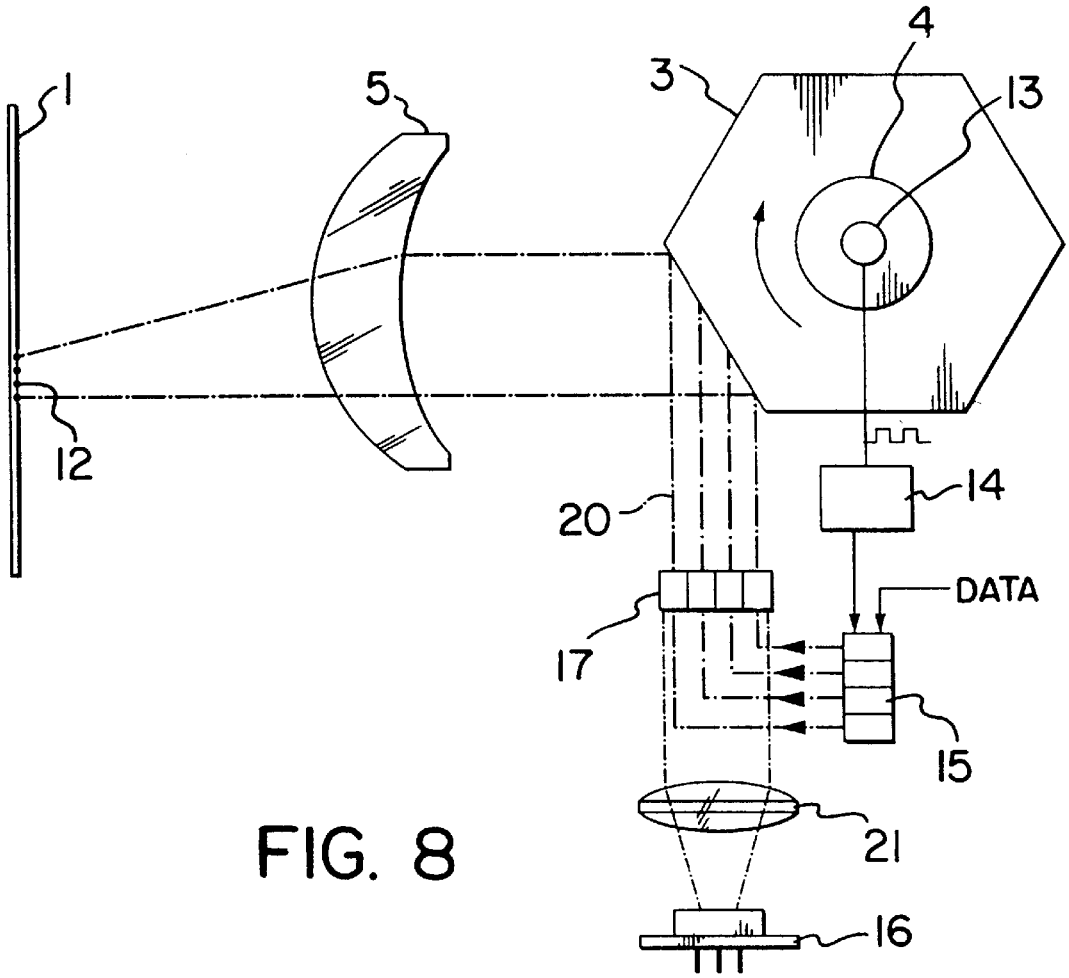
FIG. 8 shows schematically the invention implemented using an electro-optical modulator. In this example, a flat field scanner was used to illustrate the invention.

Finally, FIG. 8 shows the use of the invention with flat field scanning. In this example an electro-optical modulator 17 was chosen to illustrate the invention, for example a modulator as disclosed in U.S. Pat. No. 4,639,073. While U.S. Pat. No. 4,639,073 uses the Scophony effect to increase resolution, the same layout can be used to increase exposure time for thermal materials and utilize low cost, low beam quality, laser sources. A polygon 3 is rotated by motor 4. The beam from laser diode 16 is collected by lens 21, passes modulator 17 reflected by polygon 3 and imaged by lens 5 onto material 1. As before, Scophony/TDI imaging conditions are met by synchronizing shift rate through shift register 15 using shaft encoder 13 and clock generator 14.

As can be seen, the invention is adaptable to any scanning system, laser source and modulator type. The three scanning systems shown were only by way of example.

What is claimed is:

1. A method for imaging on a thermographic material, the method comprising:

(a) providing a layer of thermographic material;

(b) scanning a beam along a line on a surface of the thermographic material in a first direction, the beam comprising images of a plurality of light sources, the images all lying on the line;

(c) providing data representing an exposure to be given to a spot lying on the line;

(d) modulating each of the light sources in response to the data in a manner synchronized with scanning the beam along the line such that:

(i) a first one of the light sources is modulated in response to the data during a dwell time when an image of the first one of the light sources is on the spot; and, (ii) each subsequent one of the light sources is modulated in response to the data during dwell times when an image of each subsequent one of the light sources is on the spot.

2. The method of claim 1 wherein a scanning velocity of the beam along the line is such that the dwell times for each of the images is too short to damage the thermographic material in the vicinity of the spot.

3. The method of claim 2 wherein a scanning velocity of the beam along the line is such that the dwell times for each of the images is too short to fully expose the thermographic material in the vicinity of the spot.

4. The method of claim 2 wherein the layer of thermographic material is on an internal cylindrical surface and scanning a beam along a line on a surface of the thermographic material comprises deflecting the beam with a rotating beam deflector located on an axis of curvature of the cylindrical surface.

5. The method of claim 4 wherein a shift register has a bit corresponding to each of the light sources and the method comprises placing the data into the shift register and clocking the shift register to modulate the light sources in sequence.

6. The method of claim 5 wherein clocking the shift register comprises applying clock pulses generated in response to rotation of the beam deflector to the shift register.

7. The method of claim 4 wherein the light sources comprise a linear array of lasers.

8. The method of claim 7 wherein the lasers are not matched in intensity.

9. The method of claim 2 wherein a shift register has a bit corresponding to each of the light sources and the method comprises placing the data into the shift register and clocking the shift register to modulate the light sources in sequence.

10. The method of claim 9 wherein the light sources comprise a linear array of lasers.

11. The method of claim 10 wherein the light sources are not matched in intensity.

12. The method of claim 9 wherein the light sources each comprise a beam split from a single laser beam and a modulator.

13. The method of claim 12 wherein a profile of the single beam is non-uniform and the individual beams are unequal in intensity.

14. The method of claim 9 wherein the light sources comprise portions of a beam outgoing from an AOM and modulating one of the light sources comprises operating a RF modulator of the AOM in response to the data and allowing the resulting acoustic wave to propagate to a portion of the AOM corresponding to the one of the light sources.

15. The method of claim 2 wherein the light sources are not matched in intensity.

16. The method of claim 1 wherein the light sources comprise a linear array of lasers and wherein the lasers are not matched in intensity.

* * * * *